US007503732B2

(12) United States Patent
Byrd

(10) Patent No.: US 7,503,732 B2
(45) Date of Patent: Mar. 17, 2009

(54) LASER-GUIDED STAIR RAIL DRILL GUIDE

(76) Inventor: Andrew Byrd, 4407 Arno Rd, Franklin, TN (US) 37064

( * ) Notice: Subject to any disclaimer, the term of this patent is extended or adjusted under 35 U.S.C. 154(b) by 292 days.

(21) Appl. No.: 11/373,978

(22) Filed: Mar. 14, 2006

(65) Prior Publication Data

US 2007/0217878 A1 Sep. 20, 2007

(51) Int. Cl.
*B23B 47/28* (2006.01)
*B23B 49/00* (2006.01)

(52) U.S. Cl. ........................ 408/77; 408/16; 408/115 R

(58) Field of Classification Search ................... 408/16, 408/77, 72 R, 115 R, 241 G; *B23B 47/28, B23B 49/00*

See application file for complete search history.

(56) References Cited

U.S. PATENT DOCUMENTS

| | | | | |
|---|---|---|---|---|
| 1,247,341 | A * | 11/1917 | Skinner | 408/77 |
| 1,408,872 | A * | 3/1922 | Everett | 408/77 |
| 1,533,381 | A * | 4/1925 | Burton | 408/77 |
| 2,140,854 | A * | 12/1938 | Schnebly | 408/72 R |
| 2,973,673 | A * | 3/1961 | Grau | 408/99 |
| 3,060,769 | A * | 10/1962 | Heider | 408/95 |
| 3,192,801 | A * | 7/1965 | Gingras | 408/9 |
| 4,010,943 | A * | 3/1977 | Eft | 269/87.1 |
| 4,442,905 | A * | 4/1984 | Agoston | 173/36 |
| 4,484,844 | A * | 11/1984 | Williams | 408/82 |
| 4,494,895 | A * | 1/1985 | Leaf | 408/236 |
| 5,052,112 | A * | 10/1991 | MacDonald | 33/263 |
| 5,137,235 | A * | 8/1992 | Wentworth et al. | 248/124.1 |
| 5,144,486 | A * | 9/1992 | Hart | 359/629 |
| 5,322,397 | A * | 6/1994 | Spear | 408/99 |
| 5,462,392 | A * | 10/1995 | Hardwick | 408/76 |
| 5,539,990 | A * | 7/1996 | Le | 33/283 |
| 6,328,505 | B1 | 12/2001 | Gibble | |
| 6,375,395 | B1 | 4/2002 | Heintzeman | |
| 6,587,184 | B2 | 7/2003 | Wursch et al. | |
| 6,692,200 | B2 | 2/2004 | Peterson | |
| 6,898,860 | B2 * | 5/2005 | Wu | 33/286 |
| 7,331,113 | B1 * | 2/2008 | Patrick et al. | 33/286 |
| 2002/0145724 | A1 * | 10/2002 | Wursch et al. | 356/4.01 |

* cited by examiner

*Primary Examiner*—David P Bryant
*Assistant Examiner*—Eric A Gates
(74) *Attorney, Agent, or Firm*—Cantor Colburn LLP

(57) ABSTRACT

A laser-guided stair rail drill guide which may be mounted on a tentatively set stair rail to aid in the alignment for drilling of the bottom of the rail and marking the surface of the riser below, by use of a laser beam aligned with a longitudinal axis of a drill bit of a drill mounted in the guide. Using the guide of the invention allows for the holes in the bottom of the stair rail and the top of the riser below to be easily and precisely aligned, so that a baluster may be installed perfectly vertically therebetween.

11 Claims, 5 Drawing Sheets

LASER-GUIDED STAIR RAIL DRILL GUIDE

BACKGROUND OF THE INVENTION

1. Field of the Invention

The present invention relates to a device and guide for drilling stair rails and treads in alignment to receive balusters. More particularly, the invention comprises a laser-guided drill press apparatus which may be mounted on a tentatively set stair rail to aid in the alignment for drilling of the bottom of the rail and marking the surface of the riser directly below, by use of a laser beam aligned with the drill bit, so that a baluster may be set perfectly vertically.

2. Description of the Prior Art

Devices for guiding drills for precision drilling, such as free standing drill presses are extremely well known in the art. Likewise, there are a number of devices for use with hand held tools, such as drills which may be adapted to specific drilling needs.

U.S. Pat. No. 6,692,200, issued to Francis Peterson on Feb. 17, 2004; U.S. Pat. No. 6,587,184, to Christoph Wursch, et al., on Jul. 1, 2003; and U.S. Pat. No. 6,328,505, to Howard Gibble on Dec. 11, 2001, each disclose guiding devices for hand held tools, such as drills, while U.S. Pat. No. 6,375,395, issued to Michael Heintzeman on Apr. 23, 2002 discloses a laser guidance device for a hand held power drill.

U.S. Patent Application Number US 2003/0108395, by Anthony Douglas, et al., published on Jun. 12, 2003 discloses a tool positioning system which facilitates the positioning of a drill at a specific site for drilling.

While each of the above cited issued and pending patents discloses a specific element of the present invention, none, taken either singly or in combination, is seen to describe the instant invention as claimed.

SUMMARY OF THE INVENTION

The present invention provides a system for positioning and drilling holes in the underside of a stair railing and, by use of a laser beam aligned with the drill bit, marking of the treads immediately below such that the holes may be precisely aligned to ensure that the balusters are vertical. With most existing systems and methods, the precise alignment of the holes for the balusters is a tedious job requiring tiring contortions by the craftsman. The present invention makes significant improvements to the process by providing a device which mounts on the railing that is to be mounted, suspending a drill from a self plumbing guide bar, and projecting a laser beam on to the upper surface of the tread below, in perfect alignment with the drill bit at the lower surface of the railing, to precisely pinpoint the points for drilling.

Accordingly, it is a principal object of the invention to provide a laser-guided stair rail drill guide which is economical to procure.

Another object of the invention is to provide a laser-guided stair rail drill guide which is relatively light weight.

It is another object of the invention to provide a laser-guided stair rail drill guide which is easy to mount for use.

It is a further object of the invention to provide a laser-guided stair rail drill guide which is easy to align for vertical drilling.

Still another object of the invention is to provide a laser-guided stair rail drill guide which is self plumbing.

It is again an object of the invention to provide a laser-guided stair rail drill guide which precisely pinpoints the locations for drilling.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
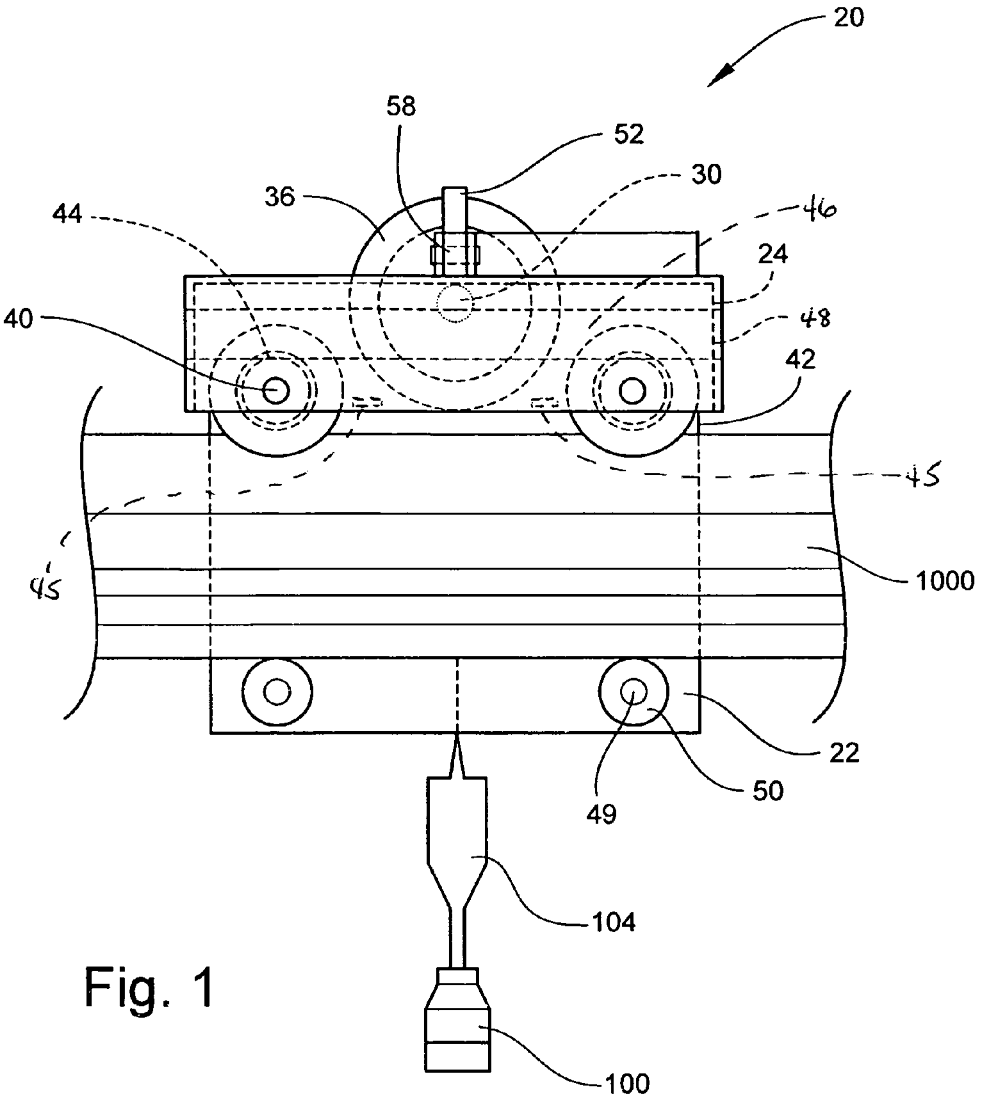
FIG. 1 is front view of a preferred embodiment of the rail guide of the laser-guided rail drill guide of the present invention.
Figure 2:
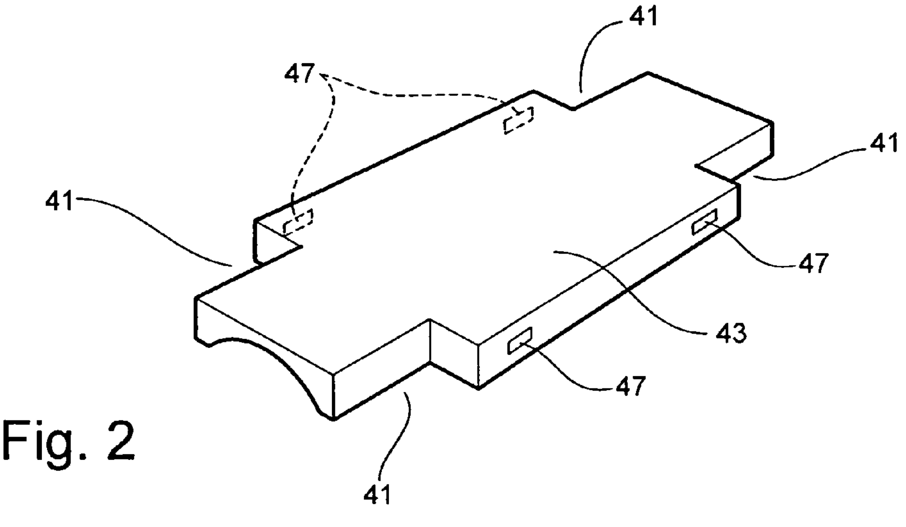
FIG. 2 is an environmental perspective view of the template of the present invention.
Figure 3:
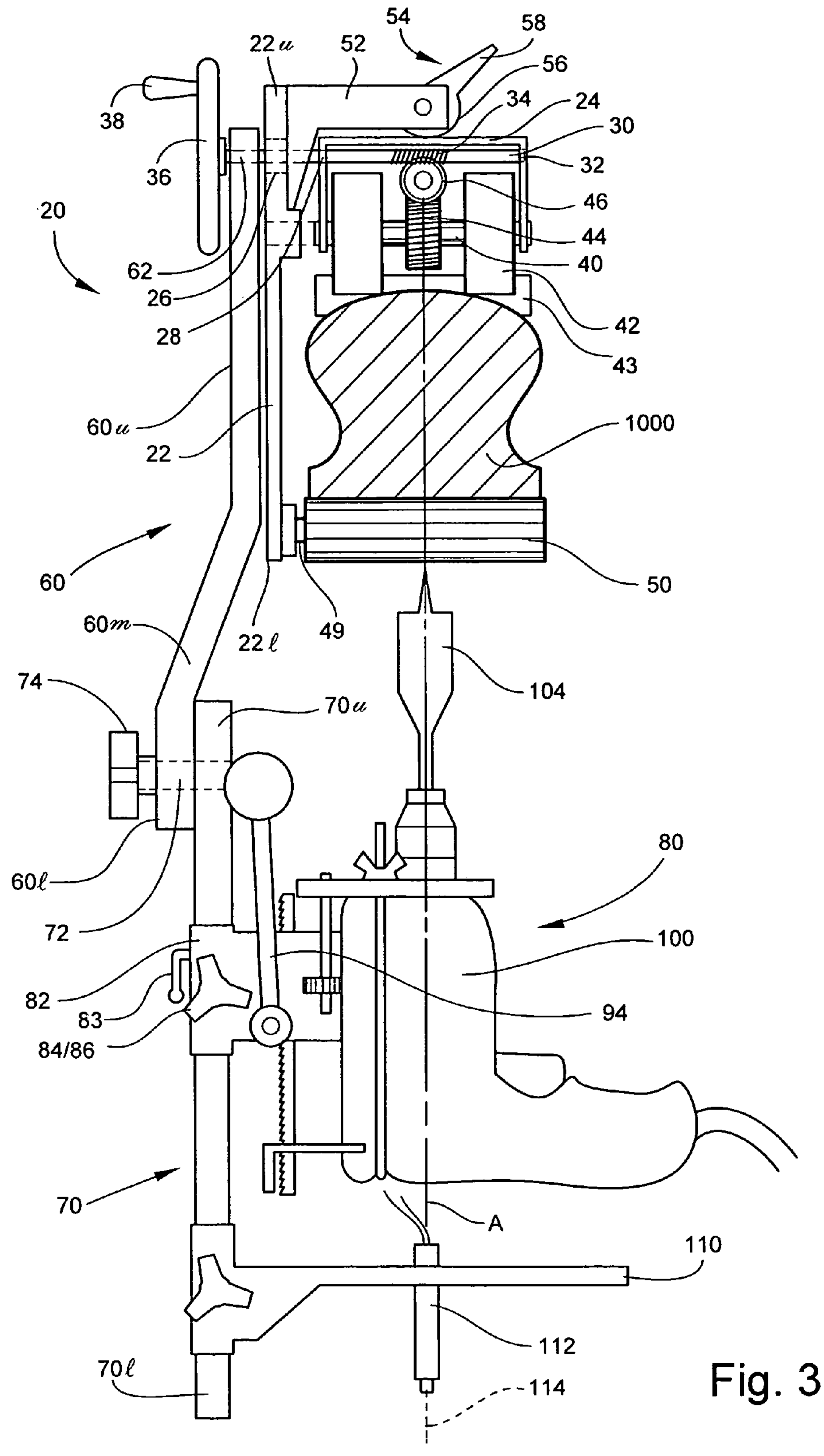
FIG. 3 is a side view of the laser-guided rail drill guide of the preferred embodiment of the present invention, the rail guide 20 being cut away at line 3-3 of FIG. 1.

The laser-guided rail drill guide 1, at FIGS. 1 through 6, of the present invention consists of five basic elements, a rail guide 20, a suspension bar 70, a drill mount assembly 80/80*a*, a drill 100 and a laser mount 110.

The rail guide 20, at FIGS. 1 and 3 through 5, has a clamp riser 22 which consists of a substantially vertical plate having a height with an upper end 22*u* and lower 22*l* end. The clamp riser 22 is preferably rectilinear in shape. A rail bracket housing 24, having a length, a width and a height, is movably affixed to and extends from the clamp riser 22, substantially normal thereto and from a point proximate upper end 22*u* of clamp riser 22. The substantially rectilinear shape of the clamp riser 22 prevents the rotation of the rail bracket housing 24 about it, thereby. Rail bracket housing 24 is substantially hollow, being opened at its lower portion. A substantially round aperture 26 is formed through the clamp riser 22. A second, substantially round aperture 28 is formed through rail bracket housing 24.

A shaft 30, having a diameter slightly smaller than that of the aperture 28, extends through the apertures 26 and 28, such that the shaft 30 may rotate within the apertures 26 and 28. Aperture 26 has a diameter significantly larger than that of shaft 30, as will be further explained hereinafter. Shaft 30 terminates, at a first end, in an aperture 32 formed in an opposite wall of the rail bracket housing 24. At a mid portion of the shaft 30, shaft 30 has a worm gear thread 34. The worm gear thread 34 may, optionally, be an enlargement of the diameter of the shaft 30 (not shown). It would be evident to one of ordinary skill in the art that shaft 30 could easily terminate at the worm gear thread 34 in lieu of continuing to the opposite wall of the rail bracket housing 24 without departing from the spirit of the present invention.

At a second, free end, the shaft 30 extends through an aperture 62 in an upper end 62*u* of a suspension bracket 60 (to be further detailed, hereinbelow), terminating in an adjustment wheel 36 having a diameter greater than that of shaft 30. Optionally, an adjustment knob 38 may be rotatably mounted proximate the perimeter of adjustment wheel 36, to aid in a more delicate rotation of the adjustment knob 38. Rotation of the adjustment wheel 36 causes rotation of the worm drive thread 34 of shaft 30.

Two axles 40 pass through the opposite walls of the rail bracket housing 24 at points proximate the juncture of the lower surface of the rail bracket housing 24 and each of its two ends. A drive wheel 42 is situated at each end of each axle 40 within the interior of the rail bracket housing 24. At the center of each axle 40 is a geared axle drive drum 44 having a diameter greater than that of the axles 40, but less than that of the drive wheels 42. A template 43, configured to substantially match the shape of the upper surface of the railing 1000 extends along the length of the rail guide 20, between the drive wheels 42. The template 43 has a notch 41 cut into each of its four corners, thereby allowing space for each of the four wheels 42 to extend past the template 43. Template 43 is held in place within the lower portion of the rail bracket housing 24 by at least one retractable clip 45 located proximate the bottom edge of the interior of each face of the rail bracket housing 24, each clip 45 engaging a notch 47 in one of the side faces of the template 43.

A central worm drive shaft 46 runs the length of the interior of the rail bracket housing 24 and has ends seated respectively within an aperture 48 situated within each of the two ends of the rail bracket housing 24. At a central portion of the worm drive shaft 46, the threads engage the worm drive threads 34 of the shaft 30, while at a point proximate each of the two ends they engage the teeth of the gears of the axle drive drums 44. Through this worm drive arrangement, rotation of the adjustment wheel 36 causes the worm drive thread 34 of shaft 30 to rotate. The worm drive threads 34, in turn, cause the worm drive shaft 46 to rotate. Likewise, the worm drive shaft 46, which engages the teeth of the axle drive drums 44, which turn the axles 40 and the drive wheels 42.

Proximate the lower end 22*l* of the clamp riser 22, a pair of lower axles 49 extend substantially normal thereto and with one of the lower axles 49 substantially parallel to and below each of the axles 40. An elongate roller 50 is rotatably mounted on each of the lower axles 49 such that each roller extends a distance substantially equal to or greater than that between the exterior of the pair of drive wheels 42 on the axles 40. It would be evident to one of ordinary skill in the art that the rollers 50 could be a pair of wheels, similar to drive wheels 42, without departing from the spirit of the present invention.

At the upper end 22*u* of the clamp riser 22 is a clamp bracket arm 52 which is offset from the clamp riser 22 such that an adjustment clamp 54 may be rotatingly attached thereto. The adjustment clamp 54 has a substantially rounded, non-symmetrical head 56 which rotates within the clamp bracket arm 52 and a handle 58 attached to the head. The non-symmetrical shape of the head 56 serves as a cam to cause compression against the upper surface of the bracket housing 24 as the adjustment clamp 54 is rotated such that the handle 58 comes down toward the bracket housing 24. A slight flattening (not shown) of the head 56 may be used, thereby allowing the adjustment clamp 54 to lock against the upper surface of the bracket housing 24, in the compressed position, forcing the bracket housing 24 downward and pulling the clamp riser upwards. By forcing the bracket housing 24 downward and the clamp riser upwards, the rail 1000 is compressed between the wheels 42 and the rollers 50. The pressure thus exerted on the rail 1000 is such that the drill guide 1 is firmly maintained in a position along the length of the rail 1000, yet rotation of the adjustment wheel 36 with adjustment clamp 54 released allows the rail guide 20 to roll along the rail 1000 being installed, to the location of each drilling site without removing the rail guide 20 from the rail 1000. As stated hereinabove, the diameter of the aperture 26 in the clamp riser 22 is significantly larger than that of the shaft 30 in order to allow the shaft 30 to slide vertically within the aperture 26 as the adjustment clamp 54 is activated.

A suspension bracket 60 hangs, pivotally, from shaft 30, and extends a long a side of clamp riser 22, opposite the rail guide 20 assembly. The suspension bracket 60 is formed from a substantially rectilinear stock, and extends below the lower end 22*u* of the clamp riser 22. The suspension bracket 60 has an upper end 60*u*, which lies substantially along the length of the clamp riser 22, and through which shaft 30 extends, as detailed hereinabove. Proximate the lower end of the clamp riser 22, the suspension bracket 60 is angled downwardly and away from the clamp riser 22 in a mid portion 60*m*. The suspension bracket 60 is again angled downwardly forming a lower end 60*l* which is substantially parallel to the upper end 60*u*. A second aperture 64 is formed through the lower end 60*l* at a point proximate the end of the suspension bracket 60.

A suspension bar 70 is rotatably mounted, at a first, upper end 70*u*, at the lower end 60*l* of the suspension bracket 60. Ideally, the upper end 70*u* of the suspension bar 70 is proximate the lower surface of the rail 1000 to be mounted, typically approximately 2.5 inches below the lower surface thereof. The suspension bar 70 is preferably rectilinear in shape to prevent rotation of a drill mount assembly 80 about the suspension bar 70. The suspension bar 70 may be rotated about a bolt 72 and secured by a nut 74 which may be tightened to maintain the suspension bar in a plumb alignment regardless of the angle at which the rail is being installed. It would be evident to one of ordinary skill in the art that the bolt 72 could either pass through an aperture in the upper end 70*u* or affixed to a side of the suspension bar 70. The nut 74, preferably incorporates a hand knob to facilitate hand tightening.

Although not an element of the suspension bar 70 of the present invention, it would be evident to one of ordinary skill in the art that levels (not shown) could be incorporated into the suspension bar 70 to ensure a true plumb is achieved.

A drill mount assembly 80 (FIG. 3) is movably mounted on the suspension bar 70. Again, the rectilinear shape of the suspension bar 70 prevents rotation of the drill mount assembly 80 around the suspension bar 70, limiting movement to a line along a longitudinal axis of the suspension bar 70.

The drill mount assembly 80 consists of a drill mount bracket 82, which fits moveably around the suspension bar 70 for vertical adjustment. In a preferred embodiment, a bolt 84 with a head 86 sufficiently large to allow hand tightening passes through an aperture in a face of the drill mount bracket 82 to engage a face of the suspension bar 70 to fix the drill mount assembly into a desired position. Optionally, a spring loaded pull pin (not shown) may be used to engage a series of apertures (not shown) spaced along the length of the suspension bar 70 to position the bracket 82 at selected, desired positions. A handle 83 may, optionally, be added to the drill mount bracket 82 to facilitate fine alignment of the drill guide manually.

Figure 4:
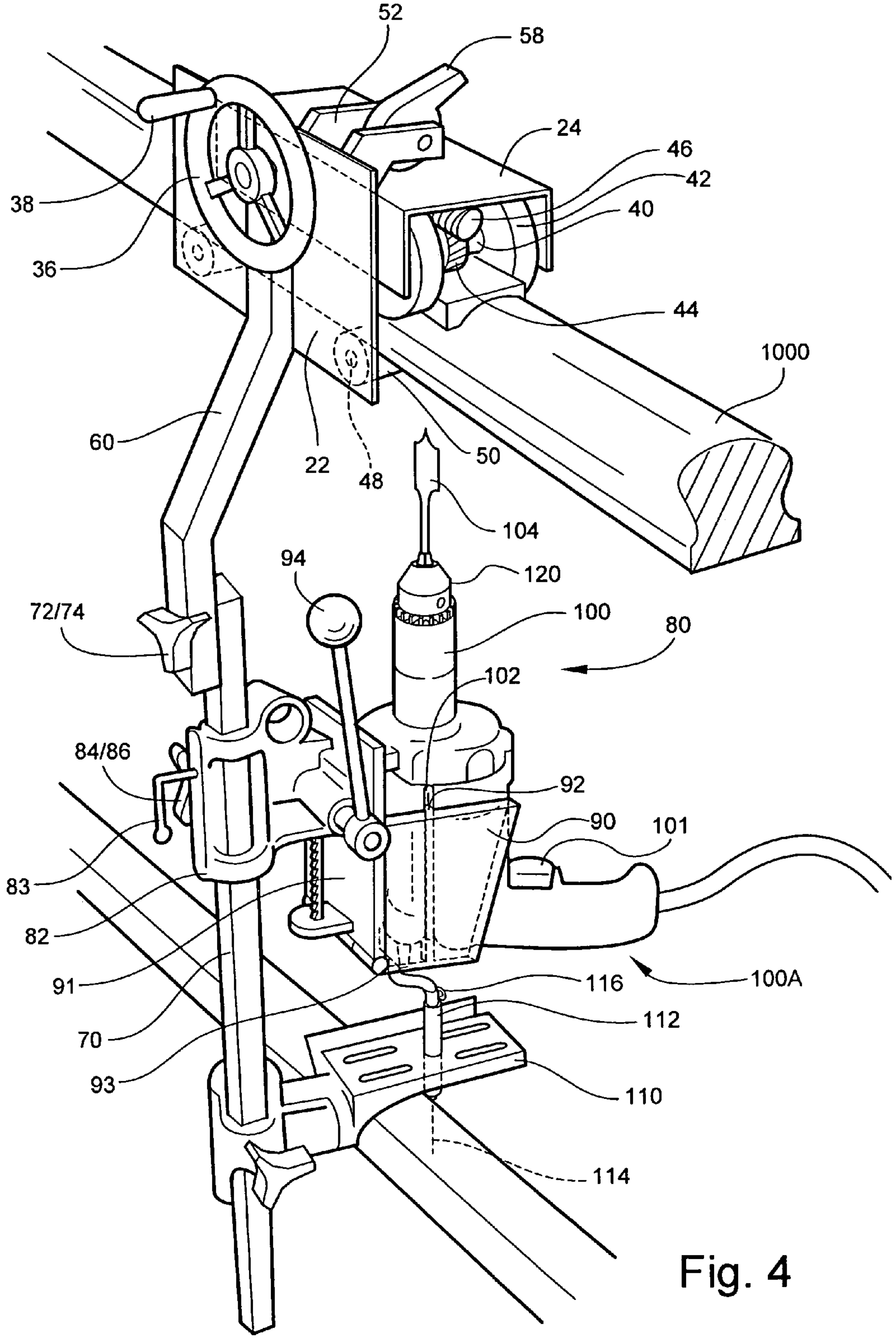
FIG. 4 is an environmental perspective view of the preferred embodiment of the present invention having a rotating drill mount assembly in its in-use position, the rail guide 20 being cut away at line 3-3 of FIG. 1.
Figure 5:
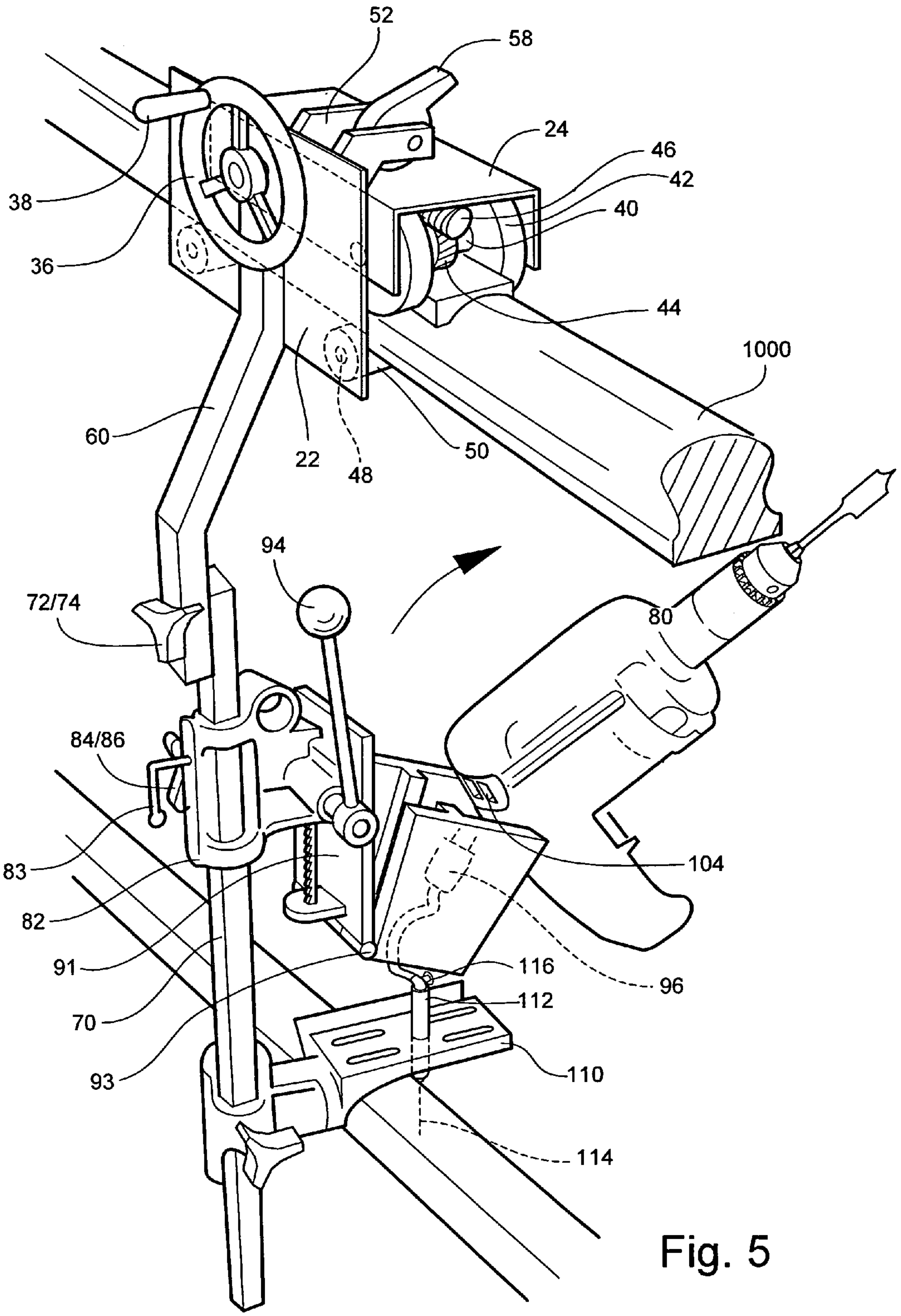
FIG. 5 is an environmental perspective view of the preferred embodiment of the present invention with the drill mount assembly in drill installation/removal position, the rail guide 20 being cut away at line 3-3 of FIG. 1.
Figure 6:
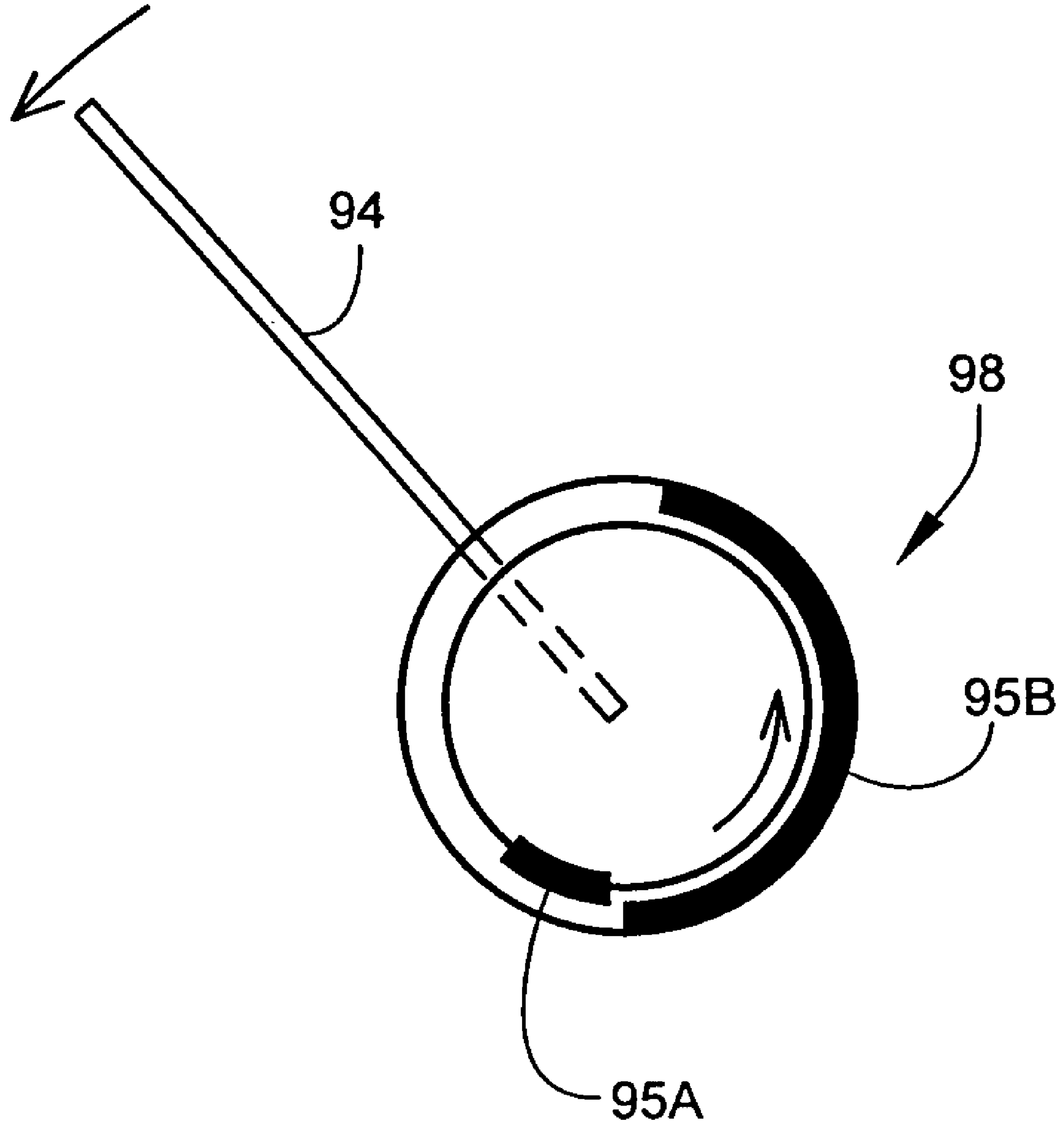
FIG. 6 is a view of a drill switch incorporated into the drill advancement handle mechanism.

In a preferred embodiment, FIGS. 4 and 5, the drill mount bracket 82 further includes a drill bracket back plate 91 with a pair of drill retention plates 90 hingedly mounted, via a hinge 93, proximate the lower edge of the drill mount bracket back plate 91 such that they are substantially parallel to one another and lie beneath the rail guide assembly 20. A drill retention ridge 92 is formed in the facing surfaces of each of the two drill retention plates 90, the drill retention ridges 92 being adapted to be received in matching nylon lined grooves 102 formed in the sides of a drill 100 specifically adapted for use with the drill mount assembly 80 of the laser guided rail drill guide 1 of the present invention. The hinged feature of the drill retention plates 90 allow the drill retention plates 90 to be moved from their vertical orientation, as when in use, to a more horizontal orientation to facilitate installing the drill 100 into the drill retention plates 90. The mating of the drill retention ridges 92 and grooves 102 of the drill 100 allow an easy, smooth installation/removal of the drill 100 into the drill retention plates 90.

A drill advancement handle 94 is rotatably attached to the drill retention back plate 91, in a geared relationship, such that as the drill advancement handle 94 is pulled, the drill attachment plates 90 move upwardly, advancing the drill 100 such that the bit 104 drills into the lower side of the rail 1000 being installed. The bit 104 engages the rail 1000 between the two sets of lower axles 48 and rollers 50.

The mechanisms of drill presses are well known in the art and are not considered to be an inventive part of the present invention, therefore they will not be discussed in further detail herein.

In a simplest form of the inventive drill guide 1, the drill 100/100A may be turned on by simply engaging the switch 101 and locking it in the on position, as may be done with most drills. Alternatively, a switch 95A/95B incorporated into the gears 98 of the pivot point of the drill advancement handle 94 may provide power to the drill 100/100A as drill advancement handle 94 is pulled to advance the drill 100/100A from its lower, retracted position to its upper, engaged position, with a first contact 95A making contact with a second contact 95B as the handle 95A is advanced. When the handle 94 is returned to the retracted position, the contact is broken and the power to the drill 100/100A is terminated.

In order to prevent burring of the drilled hole, it is desirable to stop the rotation of the drill bit 104 at the maximum desired depth of the drilled hole. In order to achieve this, the switch of FIG. 6 may be designed to open when the drill 100/100A is fully advanced (not shown), or a clutch 120 may be built into the drill 100/100A or installed into the chuck of the drill 100/100A. DeWalt International Tool Company currently manufactures a clutch, model number DW257, which is well suited to this purpose, therefore the details of the clutch 120 will not be further discussed.

A laser mount plate 110 is fixedly attached to the suspension bar 70, substantially normal thereto and below the drill mount assembly 80. A laser device 112 is attached to the laser mount plate such that the laser projects a beam 114 downwardly along a line coincidental with the line of axis of travel of the drill 100/100A and bit 104. A true alignment of the point of drilling of the rail and the tread below is ensured through the alignment of the bit 104 and laser beam 114. Power to the laser 112 may be constant, or a switch 116 may be incorporated into the laser 112, thereby allowing the laser to be turned off when not needed.

Power to the switch 95A/95B and laser 112 may be provided through the drill 100/100A unit or through a power box within the drill mount assembly 80 with equal effectiveness, and may vary from one embodiment of the present invention to another. However, in a preferred embodiment, a female electrical plug 104 is incorporated into the base of the drill 100A in a position which allows connection to a male plug 96 formed in the base of the drill mount assembly 80, the male plug 96 being in a wired relationship to the laser 112. This female 104/male 96 plug allows an electrical connection from the drill 100A to the laser 112.

When in use, the shank of the drill 100/100A, bit 104 and laser 112 lie along a common axis A ensuring proper alignment of the holes in the railing and the riser below.

In use, a template 43 corresponding to the contour of the upper surface of the rail 1000 mounted between the drive wheels 42 of the rail guide 20, and then the rail guide 20 is placed atop the rail 1000, with drive wheels 42 atop the rail 1000 and the rollers 50 below the rail 1000. The adjustment clamp 54 is used to draw the rollers 50 tightly against the bottom of the rail 1000, holding the rail guide 20 firmly, but movably in place.

After the rail guide 20 has been mounted, the suspension bar 70 is adjusted such that it hangs vertically from the rail guide, with the drill mount assembly in a position such that the tip of the bit 104 of the drill 100/100A is just below the lower surface of the rail 1000. Since the drill bit 104 and the laser 112 lie along a common axis, the bit 104 is now aligned with a beam projected onto the tread below, allowing drilling of the railing and marking of the point for later drilling the tread to align a with the hole formed in the railing 1000. As in typical drill press assemblies, the drill advancement handle 94 raises and lowers the drill 100/100A and thus the bit 104 to drill the underside of the rail 1000.

After each hole is drilled in the rail 1000 and the tread below is marked, the rail guide may easily be moved along the length of the rail 1000 by turning the adjustment wheel 36 which turns the drive wheels 42 which traverse the top of the rail 1000 to the next drilling site. Conversely, the drilling locations may be laid out on the tread and the drilling location in the railing 1000 located by aligning the laser on the laid out points.

It is to be understood that the present invention is not limited to the embodiments described above, but encompasses any and all embodiments within the scope of the following claims.

What is claimed is:

1. A laser-guided stair rail drill guide comprising:

suspension structure configured for suspending a drill from a stair rail being installed, the drill having a bit with a longitudinal axis, the suspension structure further configured to position the drill with its bit oriented vertically upward so that, when suspended from a stair rail, the bit points toward an underside of the stair rail; said suspension structure comprising: a clamp riser configured for placement adjacent the side of a stair rail to be drilled while the stair rail drill guide is in use, upper contact structure supported at an upper end of said clamp riser, said upper contact structure being shaped and configured for contacting an upper side of said stair rail; lower contact structure secured to a lower end of said clamp riser, said lower contact structure being shaped and configured for contacting an underside of said stair rail; clamping structure located at said upper end of said clamp riser for selectively causing said upper contact structure and said lower contact structure to move towards one another, thereby clamping said stair rail therebetween and securing said laser-guided stair rail drill guide in position relative to the stair rail; a laser; laser-supporting structure which supports said laser in relation to said suspension structure such that, when in use, said laser's beam points toward a stair tread located below the stair rail, with the beam of said laser coaxially aligned with the longitudinal axis of the bit of a drill suspended by said suspension structure; wherein, by aligning said laser beam with a site for a first hole to be drilled in the stair tread for receiving a lower end of a baluster, a second hole can be drilled in the underside of the stair rail in accurate vertical alignment with said first hole, said second hole being for receiving an upper end of the baluster, such that, when positioned between said first and second holes, said baluster is plumb.

2. A laser-guided stair rail drill guide, as defined in claim 1, wherein:

said suspension structure further comprises:

an elongate suspension element having an upper end supported substantially adjacent to a portion of said clamp riser and having a lower end hanging a substantial distance below said lower end of said clamp riser;

a drill mount assembly supported part way along the length of said elongate suspension element; and said laser-supporting structure comprises a laser mount supported near the lower end of said elongate suspension element.

3. A laser-guided stair rail drill guide, as defined in claim 2, wherein:

said lower contact structure comprises a roller;

said upper contact structure comprises a substantially hollow rail bracket housing containing therein:

two pairs of drive wheels supported, respectively, at opposite ends of a pair of axles, said wheels resting, when in use, on an upper surface of said stair rail;

a geared axle drive drum supported substantially midway along each of said pair of axles, said geared axle drive drum having teeth;

a worm drive shaft engaging said teeth of said axle drive drums;

a central worm drive gear running the length of the interior of said rail bracket housing and engaging said worm drive shaft, with one end of said central worm drive gear extending to an exterior of said rail bracket housing and terminating in an adjustment wheel;

whereby, when said clamping structure is.not engaged, rotation of said adjustment wheel rotates said central worm drive gear, which rotates said axle drive drums, which causes said axles and said wheels mounted thereon to rotate, thereby causing said laser-guided stair rail drill guide to be propelled longitudinally along a stair rail on which said wheels rest, when in use, to enable a drill supported thereby to be moved from one point along the stair rail where a hole is to be drilled to another point along the stair rail where a hole is to be drilled.

4. A laser-guided stair rail drill guide, as defined in claim 3, further including a template positioned between said wheels of said upper contact structure, said template having a lower surface configured to substantially match the shape of the upper surface of a stair rail with which the laser-guided stair rail drill guide is intended to be used.

5. A laser-guided stair rail drill guide as defined in claim 2, wherein said elongate suspension element comprises an upper portion and a lower portion, with said upper portion of said elongate suspension element being pivotally connected to said lower portion of said elongate suspension element at a pivot point, and further including securing structure located at said pivot point capable of selectively securing said upper portion relative to said lower portion in a desired pivotal orientation, whereby, in use, after said laser-guided stair rail drill guide is secured to a stair rail being installed, said lower portion of said elongate suspension element, which supports said laser and said drill, can be pivotally adjusted to an orientation where said lower portion is plumb. and secured so that it remains in said orientation throughout the installation process.

6. A method of drilling a hole in the underside of a stair rail using the laser-guided stair rail drill guide of claim 5, comprising:

positioning said suspension structure on a stair rail;

installing a drill having a drill bit into the structure for suspending a drill, such that the drill is supported between the stair rail and a stair tread below, with the drill bit pointing toward the underside of the stair rail;

pivoting said lower portion of said elongate suspension element relative to said upper portion of said elongate suspension element to an orientation where said lower portion of said elongate suspension element is plumb and securing said lower portion of said elongate suspension element in said orientation:

locating the suspension structure on said stair rail such that the laser beam aligns with a first point on the stair tread where a hole is to be, or has been, drilled, whereby the drill bit is vertically aligned with said first point;

drilling a holein the underside of the stair rail.

7. A method of drilling a hole in the underside of a stair rail, as defined in claim 6, further comprising:

relocating the suspension structure on said stair rail such that the laser beam aligns with a second point on the stair tread where a hole is to be, or has been, drilled, whereby the drill bit is vertically aligned with said second point.

8. A laser-guided stair rail drill guide, as defined in claim 2, further including a drill advancement handle rotatably attached in a geared relationship to the drill mount assembly such that, when in use, rotation of said handle in a first direction causes a drill mounted on said drill mount assembly to advance so that the bit of the drill contacts and drills into the underside of the stair rail, and rotation of said handle in an opposite direction retracts said drill to its original position.

9. A laser-guided stair rail drill guide, as defined in claim 8, wherein said rotationally attached drill advancement handle further includes a power switch incorporated therein, whereby rotation of the handle in said first direction causes the drill to turn on in addition to advancing its position, and rotation of the handle in said opposite direction terminates power to said drill when it is in its original, refracted position.

10. A laser-guided stair rail drill guide, as defined in claim 2, further including:

said drill mount assembly being releasably secured to said elongate suspension element by drill mount securing structure in such a manner that said position of said drill mount assembly along the length of said elongate suspension element can be adjusted to a desired position and fixed in place relative to said elongate suspension element at said desired position, said drill mount assembly being secured to said elongate suspension element in such a way that a drill mounted thereto can be advanced and retracted relative to said elongate suspension element while said drill mount assembly remains secured in place to said elongate suspension element fixed in said desired position; and said laser mount being releasably secured to said elongate suspension element by laser mount securing structure in such a manner that said position of said laser mount along the length of said elongate suspension element can be adjusted to a desired position and fixed in place relative to said elongate suspension element, thereby securina said laser in a fixed position relative to the elongate suspension element, whereby, in use, the laser remains in a fixed position relative to the elognate suspension element while the drill is advanced and retracted as it drill holes in the stair rail.

11. A laser-guided stair rail drill guide, as defined in claim 2, wherein said drill mount assembly comprises:

a drill bracket back plate having an upper edge, a lower edge, and two side edges;

two drill retention plates each having an upper edge, a lower edge, and two side edges, said drill retention plates being positioned at substantially right angles to and adjacent respective side edges of said drill bracket back plate, with a lower end of one of said side edges of each of said drill retention plates being pivotally mounted with respect to said drill bracket back plate such that in an in-use position, the entire length of said one of said side edges of each of said drill retention plates extends substantially adjacent to a respective side edge of said drill bracket back plate, thereby securing said drill in place within said drill mount assembly, and in an installation position, an upper end of said one of said side edges of each of said drill retention plates is positioned at a distance from said respective side edge of said drill bracket back plate, thereby facilitating installation and removal of said drill relative to said drill mount assembly.

* * * * *